US006968931B2

(12) United States Patent  (10) Patent No.: US 6,968,931 B2
Huisman  (45) Date of Patent: Nov. 29, 2005

(54) SHOCK ABSORBER WITH GUIDING SYSTEM

(76) Inventor: Marius Jacobus Huisman, Industrieweg 14, NL-2821 Al Stolwijk (NL)

(*) Notice: Subject to any disclaimer, the term of this patent is extended or adjusted under 35 U.S.C. 154(b) by 0 days.

(21) Appl. No.: 10/381,994

(22) PCT Filed: May 22, 2002

(86) PCT No.: PCT/NL02/00321

§ 371 (c)(1),
(2), (4) Date: Jun. 3, 2003

(87) PCT Pub. No.: WO03/020541

PCT Pub. Date: Mar. 13, 2003

(65) Prior Publication Data

US 2004/0026196 A1   Feb. 12, 2004

(30) Foreign Application Priority Data

Sep. 3, 2001  (NL) .................................. 1018872

(51) Int. Cl.[7] ...................... B60G 13/00; B60G 15/06; B60G 3/01; F16F 9/54
(52) U.S. Cl. ............. 188/322.19; 267/221; 188/322.16
(58) Field of Search .................. 188/322.19, 322.16, 188/322.17, 322.18, 322.12, 315; 267/221; 280/276, 124.127; 384/49, 50, 53

(56) References Cited

U.S. PATENT DOCUMENTS 2,325,894 A * 8/1943 Berry et al. .......... 280/124.127
4,290,511 A * 9/1981 de Baan et al. ........ 188/322.17
4,306,638 A * 12/1981 Malott .................... 188/322.16
4,966,257 A * 10/1990 Axthammer ........... 188/322.17
5,044,648 A * 9/1991 Knapp ........................ 280/283
5,380,026 A * 1/1995 Robinson .................... 280/276
5,927,738 A * 7/1999 Kesinger .................... 280/220
5,941,351 A * 8/1999 Etnyre .................... 188/322.17
6,186,487 B1 * 2/2001 Kesinger .................... 267/249
6,241,391 B1 * 6/2001 Hoose ......................... 384/49
6,637,559 B2 * 10/2003 Hoose .................... 188/322.16
2004/0026196 A1 * 2/2004 Huisman ............... 188/322.16

FOREIGN PATENT DOCUMENTS

DE   1405372   * 10/1968
DE   7613092   * 10/1976
EP    899134   *  3/1999

* cited by examiner

Primary Examiner—Douglas C. Butler
(74) Attorney, Agent, or Firm—Ladas and Parry LLP

(57) ABSTRACT

The present invention relates to an improved shock absorber with guiding system for, for example, racing and Formula cars and such, due to which larger horizontal bend powers F can be taken without considerable wear and further problems, in which the shock absorber consists of a telescopic first or upper tube (15) and second or bottom tube (16) with a damping, for oil bored piston (17), in which the sliding into each other of the mentioned tube parts is executed by means of roller bearings (22, 23), which are adjusted to the radius of the concerned tube, through which in a surprisingly inventive way a very high-quality spring and shock absorber is created for the Formula cars.

4 Claims, 3 Drawing Sheets

SHOCK ABSORBER WITH GUIDING SYSTEM

FIELD OF THE INVENTION

The present invention relates to a device for springing off of the wheel suspension of especially cars and automobiles for the race and Formula sport, in which the contact of the wheels on the road must be very optimal, in which a spring and shock absorber are used that are generally constructed according to the MacPherson principle, in which in the oil-filled tube a bored or for oil passable piston is placed, which supports the bodywork (not indicated) by means of a solid piston rod of approximately 18 mm diameter together with the applied coiled spring.

BACKGROUND

In the Formula racing world and especially on Formula and racing cars the spring and shock absorber systems are applied according to the MacPherson principle and mostly on the front-wheel suspension. This system is also often used on the front wheels of private cars. The constant improvement of the driving comfort of private cars lead to using spring elements with little self-damping. After an impact the springs oscillate for a long time. Due to this, the wheel can jump up and down, through which the contact with the road is periodically interrupted. The shock absorbers are for damping these movements or, vibrations, as soon as possible. A better word would be vibration damper. The shock absorber is mounted between the wheel suspension and the superstructure or the bodywork. These days almost only hydraulic shock absorbers are used. These are almost always telescopic shock absorbers with an oil-filled tube, in which a, piston with a small bore is movable up and down and so the piston rod moves, which supports the body. The mentioned piston rod is solid and has a circle-shaped. cross-section with a diameter of approximately 18 mm, which for an occurring horizontal load (F) is enough for private cars. The upper side of mentioned piston rod is mounted to the body with an eye structure and the bottom side of the oil-filled and the on both sides closed tube, in which the mentioned drilled piston with piston rod moves up and down, is supplied with stub axle means for mounting to the wheel suspension. Following, according to the MacPherson principle, the shock absorber is provided with a coiled spring so that in one go a spring and damping system is created. This system is economically fabricated and works well on private cars with bend forces transverse to the driving direction of the vehicle.

At the racing sport with Formula cars it appears that when taking turns on an asphalt road or gravel or on damages in the road surface, large forces (F) occur transverse to the tire. Due to this, the shock absorber with coiled spring must transmit a large bend moment vertical on its longitudinal axis, which torque must also be absorbed by the solid piston rod with a diameter of approximately 18 mm. The consequence is a rather large deformation of the longitudinal axis of the piston rod, through which it contacts at a single point of the tube and the piston. Through mentioned deformation the slide or friction resistance of the piston rod and piston is enlarged, through which the shock absorber starts showing blocking properties, which enlarges the brake path and the wheel starts jumping.

For the racing sport as described above the known spring and shock absorbers in Formula sports cars, show a number of disadvantages regarding applicability.

SUMMARY OF THE INVENTION

The aim of the present invention concerns to provide such a spring and shock absorber in which the aforementioned disadvantages are eliminated and of which the performance is better and which shock absorber can be produced in an economical way. This must be seen in view of the technical life, which is considerably longer than the known spring and shock absorber according to the MacPherson principle and then especially for the Formula racing cars.

Therefore a device, in this case, a shock absorber is further developed in a very inventive way, in which the piston rod is placed unloaded for horizontal loads in an upper or first very rigid tube, in which the mentioned upper or first tube has an inner/outer diameter of approximately 50/55 mm, in which the mentioned piston rod with piston works in a direction from bottom to top and in which the whole is telescopic and extending in an outer second or bottom tube with an inner/outer diameter of approximately 60/70 mm, in which for decreasing the friction, a pair of bearings are mounted, applied in a circle-shape at a distance L from each other, and so form the first and second bearing, in which the second bearing is fixed on a support tube stub and is axially rotatable by means of a sliding fit around the upper or first tube, in which the material of the device is construction material with a high elastic modulus.

The advantage is a hardly deformable shock absorber which executes the necessary movements without considerable deformation and frictions.

Furthermore the device according to the invention is further developed in such a way, that the mentioned bearings are roller bearings, in which the bearing surface of the rollers are adjusted to the outer radius of the mentioned upper or first tube and respectively the inner radius of the mentioned bottom or second tube with inner diameter of approximately 60 mm.

The advantage is that the resistance against sliding and turning is almost nil and the shock absorber does its work optimally all the time.

BRIEF DESCRIPTION OF THE DRAWINGS

The preferred construction of the invention will be described by way of example, and with reference to the accompanying drawing, in which.

DETAILED DESCRIPTION

Figure 1:
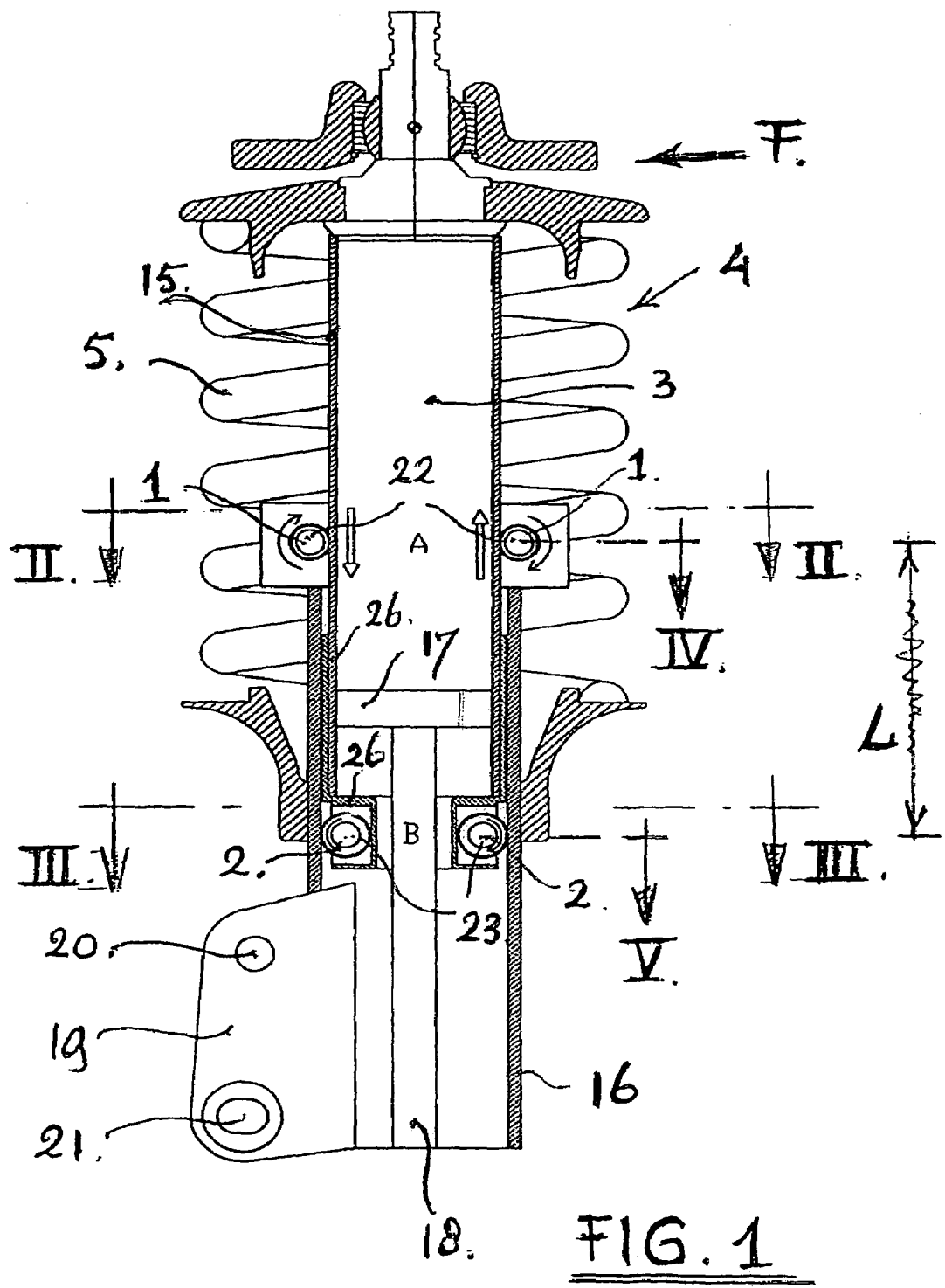
FIG. 1 shows a schematic Longitudinal cross-section of the improved shock absorber with a guiding system for Formula racing cars according to a preferred embodiment of the invention.

FIG. 1 shows a schematic longitudinal cross-section of the improved shock absorber 3 with guiding system 1, 2 according to the preferred embodiment of the invention. The spring and shock absorber 4 consist of the aforementioned shock absorber 3 and a coiled spring 5 mounted around it.

Figure 6:
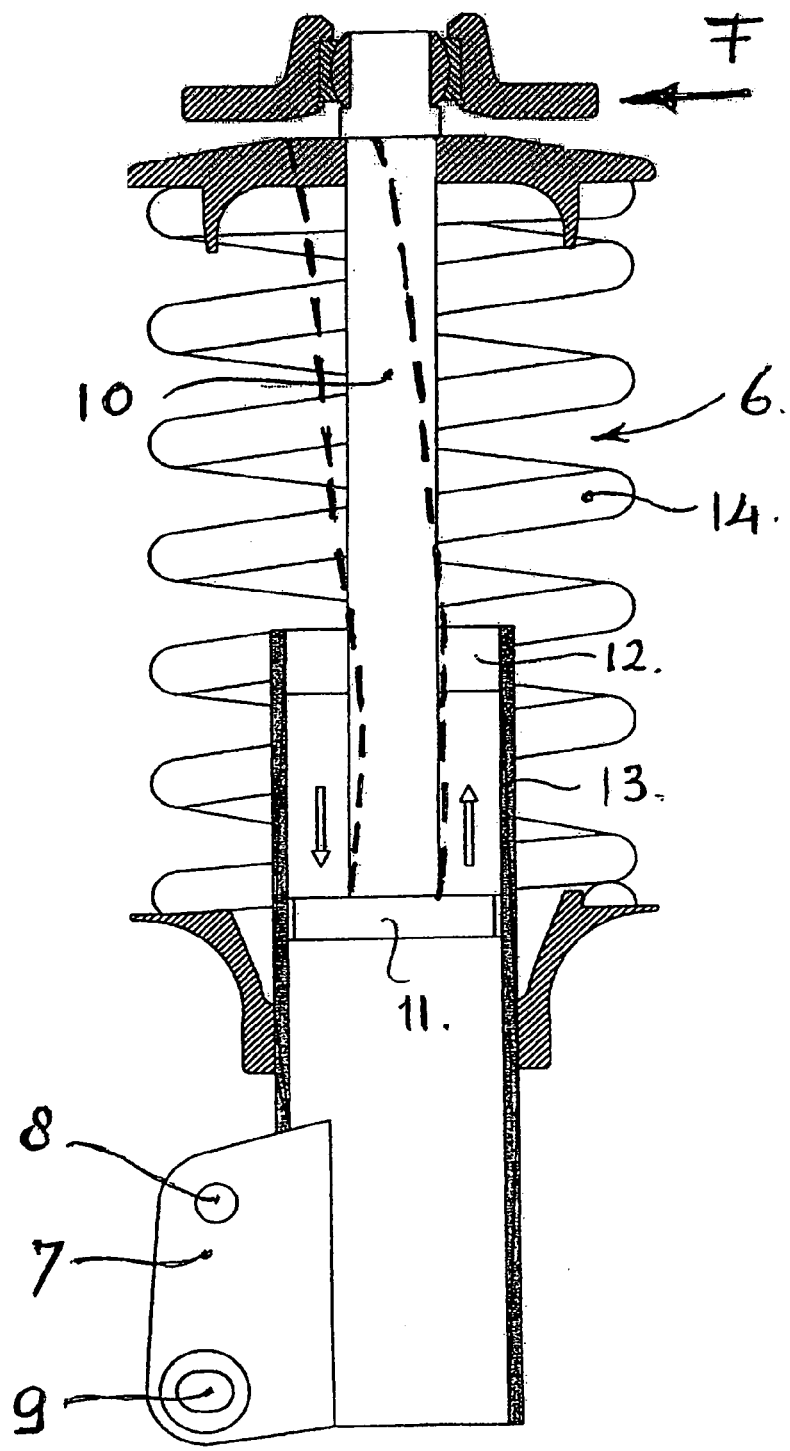
FIG. 6 shows a schematic longitudinal cross-section of a generally known shock absorber.

Actually, it is a strongly improved MacPherson spring and shock absorber 6, as shown in FIG. 6.

Further for FIG. 6 is the following explanation. The bracket 7 is mounted moment tight to the wheel suspension (not indicated) by means of stub axle pins through the bores 8 and 9. The spring and shock absorber 6, by means of the bracket, are vertically fixed so that a horizontal force F is considerable when taking a sharp curve and measurements show it can go up to 12 kN. Due to this the piston rod 10 with a solid diameter of approximately 1.8 mm bends in horizontal direction (see dotted line), through which the piston 11 and the telescopic connection 12 clamps and so claw or jam in the cylinder wall 13. This especially occurs by the up and down movement of the coiled spring 14. In short, a very fast wear of the known spring and shock absorber 6, due to which new systems of the known type must be constantly mounted on the Formula car.

FIG. 1 also shows the improved spring shock absorber 4 according to a preferred embodiment of the invention.

The mentioned system exists roughly of two telescopic tubes, being an upper or a first tube 15 and a bottom or second tube 16. In the first or upper tube 15 the piston 17 with the accompanying piston rod 18 is located. Here also the bottom or second tube 16 is mounted moment tight by means of a bracket 19 by means of stub axle pins through bores 20 and 221 to the wheel suspension (not indicated). So the spring and shock absorber according to the invention are fixed and when taking a curve with the Formula car yet again the horizontal forces F arise, but now the horizontal deformation will be almost nil due to the much larger moment of inertia or quadratic surface moment of the upper and bottom tubes 15, 16 with outer diameters of 55 mm and 70 mm respectively.

Furthermore a strongly improved vertical guiding is created with the so called roller bearings 22 and 23, through which the vertical sliding of the tubes 15 and 16 due to changing the length of the coiled spring 5 occurs almost without friction.

Furthermore, the mentioned bottom roller bearing 23, mounted on a support tube stub 26, which is connected with a sliding fit to the upper or first tube 15, through which also rotation of the roller bearing 23 around the longitudinal axis of the shock absorber is possible at any steering movement.

Figure 2:
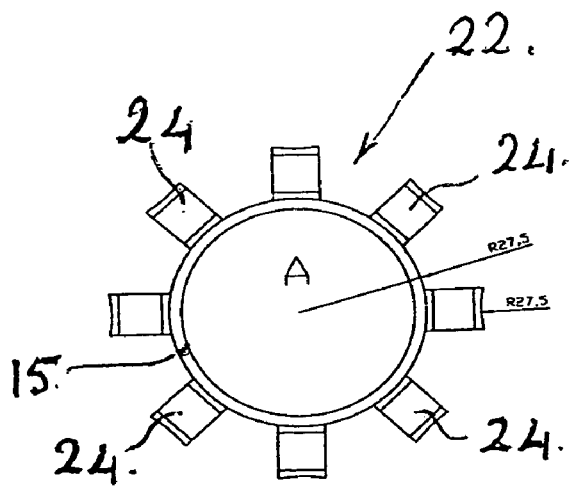
FIG. 2 shows schematically a cross-section over the upper roller bearing according to the line II—II of FIG. 1.
Figure 4:
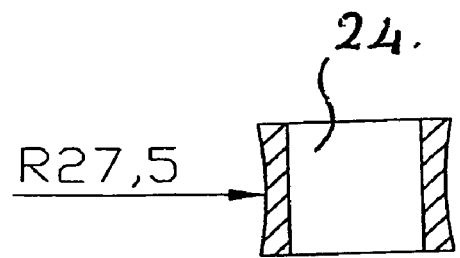
FIG. 4 shows a cross-section over the line IV of FIG. 1.

FIGS. 2 and 4 show the upper roller bearing 22, in which the bearing surface of the rollers 24 are concave and adjusted to the curve of the upper or first tub 15.

Figure 3:
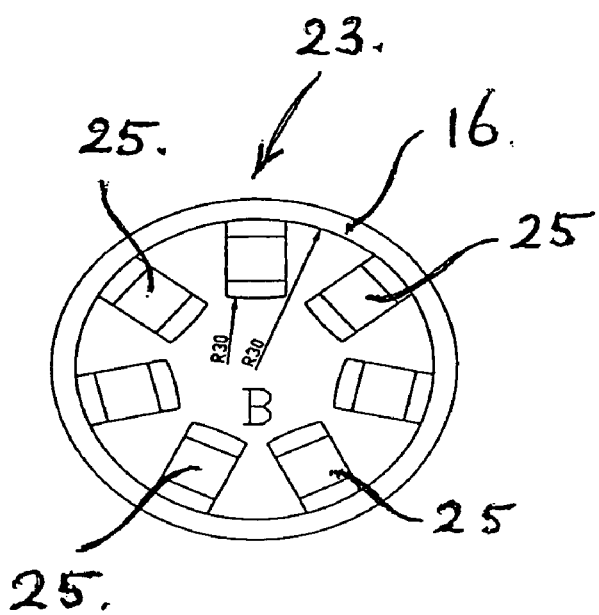
FIG. 3 shows schematically a cross-section over the bottom roller bearing according to the line III—III of FIG. 1.
Figure 5:
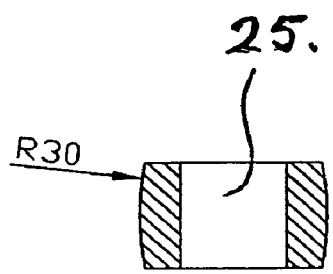
FIG. 5 shows a cross-section over the line V of FIG. 1.

FIGS. 3 and 5 show the bottom roller bearing 23, in which the bearing surface of the rollers 25 are convex and adjusted to the curve of the bottom or second tube 16.

Finally it has to be emphasized, that the above description constitutes a preferred embodiment of the present invention and that further variations and modifications are still possible without departing the scope of this patent description.

What is claimed is:

1. A suspended shock absorber having a bearing arrangement and coil spring, the shock absorber having only first and second tubes in which the first tube is telescopically slidable in the second tube along a longitudinal axis, a piston rod mounted in the second tube and a piston on said piston rod in slidable contact in said first tube for reciprocal travel therein, said bearing arrangement comprising:

first and second bearings respectively engaging said first and second tubes for guiding movement of said first tube within said second tube, said first bearing being mounted on a support tube stub secured around an outer surface of said first tube, said first bearing including a plurality of first rollers having outer surfaces in contact with the outer surface of said first tubes said first rollers having concave outer surfaces corresponding to the outer surface of said first tube, said concave surfaces being in rolling contact with the outer surface of said first tube, said first rollers being rotatable in said first bearing around axes which are perpendicular to said longitudinal axis along which the first tube is movable, said second bearing being mounted on a support tube stub at a lower end of the first tube and includes a plurality of second rollers in contact with an inner surface of said second tube, said second rollers having convex outer surfaces corresponding to the inner surface of said second tube, said convex surfaces being in rolling contact with said inner surface of said second tube, said second rollers being rotatable in said second bearing around axes which are perpendicular to said longitudinal axis along which the first tube is movable; and wherein the first and second tubes are circular in cross-section, the convex outer surfaces of the second rollers of the second bearing are adapted to the inner diameter of the second tube and the concave outer surfaces of the first rollers of the first bearing are adapted to the outer diameter of the first tube.

2. The shock absorber of claim 1, wherein a distance L between the first and second bearings varies between approximately 50 mm and 150 mm.

3. The shock absorber of claim 1, wherein the first tube has an inner/outer diameter of approximately 50/55 mm and the second tube has an inner/outer diameter of approximately 60/70 mm.

4. The shock absorber of claim 1, wherein said first rollers are equally arranged all around said first tube and said second rollers are equally arranged within said second tube.

* * * * *